(12) United States Patent
Gernert et al.

(10) Patent No.: US 6,600,734 B1
(45) Date of Patent: Jul. 29, 2003

(54) APPARATUS FOR INTERFACING A WIRELESS LOCAL NETWORK AND A WIRED VOICE TELECOMMUNICATIONS SYSTEM

(75) Inventors: Alex Gernert, Cupertino, CA (US); Sarosh Vesuna, Los Altos, CA (US); David Goren, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/213,958

(22) Filed: Dec. 17, 1998

(51) Int. Cl.[7] ............................................. H04L 12/66
(52) U.S. Cl. ....................... 370/352; 370/328; 455/403
(58) Field of Search ............................... 370/312, 313, 370/328, 401, 329, 349, 352–358; 455/432, 403, 425, 550, 575

(56) References Cited

U.S. PATENT DOCUMENTS

| | | | |
|---|---|---|---|
| 6,259,898 B1 | * | 7/2001 | Lewis ......................... 455/103 |
| 6,298,062 B1 | * | 10/2001 | Gardell et al. .............. 370/401 |
| 6,330,244 B1 | * | 12/2001 | Swartz et al. ............... 370/401 |

* cited by examiner

Primary Examiner—Wellington Chin
Assistant Examiner—Brenda Pham (57) ABSTRACT

An apparatus for interfacing a wireless local area network with a wide area, cellular or public switched telephone network including the function of a wireless LAN base station or access point, and a gateway. The interface may contain one or more different types of gateways, including a PSTN voice gateway, an analog modem gateway, and others. The apparatus may also include a well designed to receive the handset or mobile computer device to recharge the battery as well as to automatically transfer data when the phone or device is secured in the well.

11 Claims, 7 Drawing Sheets

APPARATUS FOR INTERFACING A WIRELESS LOCAL NETWORK AND A WIRED VOICE TELECOMMUNICATIONS SYSTEM

RELATED APPLICATIONS

This application is related to U.S. patent application Ser. No. 08/794,782, filed Feb. 3, 1997.

This application is also related to U.S. patent application Ser. No. 08/906,722, filed Aug. 5, 1997.

This application is also related to U.S. patent application Ser. No. 09/008,710, filed Jan. 16, 1998.

This application is also related to U.S. patent application Ser. No. 09/047,015, filed Mar. 24, 1998.

Each of the above applications are expressly incorporated herein by reference.

BACKGROUND OF THE INVENTION

1. Field of the Invention

The present invention relates to the field of voice communications over different types of communications networks. More specifically, the present invention relates to an apparatus which interfaces a wireless IP network and a wide area network or public switched telephone network (PSTN) for voice communications.

2. The Background Art

Public switched telephone networks have been used for many years for voice communication. The typical telephone converts sound waves into analog signals, which are then transmitted through the public switched telephone network to another telephone, which converts the analog audio signals back into sound waves. In recent years, wireless and cellular telephones have been rising in popularity, due to their mobility. Users are no longer tied to a stationary telephone, but are free to carry their telephones with them.

With the advent of computers and fax machines, there arose a need to transmit data in a similar fashion. Due to the fact that analog telephone lines were already in existence in every part of the nation, these lines were also used in the transmission of data. Specific protocols were designed, such as the V.32 protocol, which specified how digital data is encoded into analog signals for transmission over public switched telephone networks.

The apparatus that performs conversion from digital data to an analog telephone signal is known as an analog modem. Analog modems do not require dedicated or specialized lines, as they use pre-existing telephone lines, which are already in existence in nearly every home in the country. The main drawback, however, is in the relatively low speed of transmissions. Current protocols allow only up to about 56 Kbps to be transmitted through an analog phone line, and FCC regulations currently limit this number to 53 Kbps due to power output concerns.

Users who require faster transmission speeds have turned to carriers which allow digital transmission, which not only provide much faster speeds and higher bandwidth, but also reduce errors that occur during transmission. Examples of such carriers are ISDN lines, T1 and T3 lines, and cable lines. ISDN lines are in actuality twisted pair telephone lines. While ISDN service allows a user to obtain digital transmission without a dedicated or specialized line, the inherent physical drawbacks of twisted pair lines limits the amount of bandwidth and speed of such systems. T1 and T3 lines are specialized, dedicated lines (T1 lines can carry up to 1.544 Mbps while T3 lines can carry up to 44.736 Mbps.

Cable modems interface to coaxial cable lines that are typically used for providing cable television signals into homes and they provide a large amount of bandwidth. While it is generally necessary for the cable provider to upgrade the overall cable network system in order to enable Internet access through cable modems, it is generally not necessary to install new lines into homes.

Wide Area Networks (WANS) using wireless data communications techniques and systems have been generally available for many years. Implementations exist which employ microwave radio-frequency (RF) communication systems and frequency-modulated (FM) radio communications. The data rate is generally up to 19.2 Kbps, which is sufficient for the intended class of applications. Frequency-modulated communication techniques include both conventional point-to-point radio and broadcast. These systems include RAM Mobile Data Service using the Mobitex protocol; the Advanced Radio Data Information Service (ARDIS), manufactured by ARDIS Company, Lincolnshire, Ill; and the Cellular Digital Packet Data (CDPD) service.

The ARDIS system, for example, uses a dedicated radio network which includes a number of radio base stations deployed throughout larger metropolitan areas in the United States. The remote devices in the field communicated with the base stations, and vice versa. The base stations are fixed and can cover an approximate radius of 15 to 20 miles when transmitting and receiving. The base stations communicate with a limited number of radio network controllers located at various points throughout the United States. Each radio network controller is responsible for maintaining authorization and registration of the remote terminals. The radio network controllers are further connected to one of three network hubs. The network hubs are connected by dedicated leased lines and are accessed by the customer host applications to send and receive data to and from the remote devices. The customer host applications are also connected to the network hubs by dedicated leased line or through a value added network VAN).

Wireless local area networks (LANS) are used in business applications such as inventory, price verification markdown, portable point of sale, order entry, shipping, receiving and package tracking. Wireless local area networks use infrared or radio frequency communications channels to communicate between portable or mobile computer units and stationary access points or base stations. These access points are in turn connected by a wired or wireless communication channel to a network infrastructure which connects groups of access points together to form a local area network, including, optionally, one or more host computer systems.

Wireless infrared and radio frequency (RF) protocols are known which support the logical interconnection of portable roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial layout, response time, and loading requirements of the network, different networking schemes and communication protocols have been designed so as to most efficiently regulate the association of the mobile unit with specific access points, and the availability of the communication channel to individual mobile units for broadcasting.

One such protocol is described in U.S. Pat. Nos. 5,029,183; 5,142,550; 5,280,498; and 5,668,803 each assigned to Symbol Technologies, Inc. and incorporated herein by reference.

Another such protocol is described in U.S. Pat. No. 5,673,031. Still another protocol is set forth in the IEEE Standard 802.11 entitled "Wireless LAN Medium Access Control (MAC) and Physical Layer (PHY) Specifications" available from the IEEE Standards Department, Piscataway, N.J. (hereinafter the "IEEE 802.11 Standard").

The IEEE 802.11 Standard permits either infrared or RF communications, at 1 Mbps and 2 Mbps data rates, a medium access technique similar to carrier sense multiple access/collision avoidance (CSMA/CA), a power-save mode particularly important for battery-operated mobile units, seamless roaming in a full cellular network, high throughput operation, diverse antennae systems designed to eliminate "dead spots", and an easy interface to existing network infrastructures.

The basic specifications for the communications of audio, video and multimedia that are applicable to the networks pertaining to the present invention are set forth in the International Telecommunications Union Telecommunication Standards Sect (ITU-T) standards H.320–323.

The H.321 recommendation relates to asynchronous transfer mode (ATM) channels, H.322 to guaranteed Quality of Service LANs, and H.323 to packet based systems. Data packets are created from a compressed data stream of digital voice samples. The data packets are formatted for transmission over a data network. Since network latency and packet transmission delays can be disastrous to the intelligibility and quality of real-time phone conversations, a variety of approaches of giving priority of voice packets (or other real-time multimedia packets) over data packets in the network have been proposed, thus allowing delay-sensitive packets to supercede data packets across any network node in any traffic situation. The H.323 recommendation also provides for call establishment and control, including determining the sequencing and timing of establishing and disconnect procedures, as well as the control of the H.323 session after it is established.

To the extent the Internet Protocol or "IP" (as set forth in IETF RFC 791) is used as the network layer protocol, the recommendations of the International Multimedia Teleconferencing Consortium's Voice over IP Forum are also applicable to such a Voice over IP ("VoIP") network. In a VoIP network, the voice signal is digitized, encapsulated into IP packets, and then routed between VoIP capable devices in an IP network. These packets of voice may then be delivered in real time as voice communications, or stored as voice mail.

Communications between a LAN and a wide area network or public switched telephone network are generally performed by communications controller known as a gateway. In the H.323 standard, a gateway generally refers to an endpoint which provides for real-time, two-way communications between H.323 terminals on an IP network and other ITU terminals, telephones on a PSTN, and terminals on other networks. An example of a gateway is the Cisco 3600 series of Cisco Systems, Inc. The Cisco 3600 series is a modular gateway that can be configured to provide gateway functions over a wide variety of communications mediums. These include, among others, analog modem access, ISDN access, digital modem access, and voice and fax access. Other types of interfaces between wired LANs and connected or switched networks such as frame relay and ATM networks are known. For example, the ATM Forum has developed a bridging implementation agreement called LAN Emulation (LANE). LANE relies on a LAN Emulation Server (LES), which performs MAC-to-ATM address resolution; a Broadcast and Unknown Server (BUS), which performs data broadcast; and an optional LAN Emulation Configuration Server (LECS), which performs initialization and configuration.

Prior to the present invention, there has not been a simple and user-transparent way to interface a wireless LAN with the diverse range of currently available public and private networks, including the public switched telephone network (PTSN), cable networks, wide area networks (WAN), cellular telephone networks, and satellite communications networks.

REFERENCES

ITU-T Recommendation G.711 (1993) "Pulse Code Modulation (PCM) OF Voice Frequencies"
ITU-T Recommendation G.729 (1995) "Coding of Speech At 8 kbit/s Using Conjugate-Structure Algebraic-Code-Excited Linear-Prediction (CS-ACELP)"
ITU-T Recommendation H.323 (May, 1996): Visual Telephone Systems and Equipment for Local Area Networks Which Provide a Non-Guaranteed Quality of Service.
ITU-T Recommendation Q.931 (1993): "Digital Subscriber Signaling System No. 1 (DSS 1)-ISDN User-Network Interface Layer 3 Specification for Basic Call Control
IETF RFC 791 "Internet Protocol". J. Postel. Sep. 1, 1981
IETF RFC 793 "Transmission Control Protocol", J. Postel. Sep. 1, 1981

BRIEF DESCRIPTION OF THE INVENTION

1. Objects of the Invention

It is an object of the invention to provide an interface between a wireless LAN and a gateway to a voice communications network.

It is another object of the present invention to provide an apparatus including a base station or access point in a wireless LAN and a communications gateway to one or more different communications channels or networks.

It is still another object of the invention to provide a portable wireless desk telephone which communicates with one or more stationary base stations using a packet communications protocol, wherein the base station interfaces to a gateway for connection to an IP network, a WAN, or the PSTN.

It is a further object of the present invention to provide an apparatus which functions as a data downloading station for a portable computer, pen-like bar code reader, or the like, and also transmits the downloaded data to an IP network, a WAN or the PSTN.

It is yet another object of the invention to provide initialization and authorization of a communications handset in a wireless LAN.

It is yet a further object of the present invention to provide an end-to-end real time voice channel through wired and wireless, and connected and connectionless (packet switched) communications channels.

It is an even further object of the invention to provide a method which can be used to accomplish one or more of the above objectives.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

The present invention provides data communications network including a plurality of stationary access points and a plurality of remote mobile units, the mobile units being capable of wirelessly communicating with at least two of the access points when located within a predetermined range therefrom and being normally associated with and in communications with a single one of such access points. A processor is located at one of the access points for detecting a message sent by a first mobile unit and determining from the message whether it is to be routed to another mobile unit or over another channel to another type of communication station; and a gateway is connected to the access point and functions to provide a two-way voice channel of communications between the first mobile unit and another communication station.

The present invention further provides an integral apparatus combining the functions of an access point and a gateway for interfacing a wireless local area network with a wide area network or the public switched telephone network. The apparatus may contain one or more gateways, including a PSTN voice gateway (including xDSL or ISDN interfaces), an analog modem gateway, and others such as a cable modem for connection to a cable network. The apparatus may also include an Ethernet port or serial port for connection to a wired local area network. The apparatus may also include a docking station or well designed to receive the handset or other portable computer device to recharge the battery of the handset or optionally transfer data or control information when the phone or device is secured in the well.

The present invention provides an end-to-end method for handling an outgoing call from a caller using a handset in a wireless local area network, through other communications networks to the called party, including the steps of
- detecting when the user activates the mobile handset to make an outgoing call;
- receiving in the mobile handset the identification of the destination of the outgoing call from the user;
- transmitting a ring signal to a network station corresponding to said destination, said ring signal designed to alert the recipient that a call is attempting to connect; and
- transmitting an acknowledgment signal to the mobile handset, said acknowledgement signal designed to alert the user that the cell made by the user is attempting to connect. The present invention further includes the steps of receiving in the handset an indication from the user of the type of call the user desires to make, and determining in the handset whether the user is making a network address call, an intercom call, or a name call.

The present invention further provides a method of operating a data communications network including a plurality of sets of stationary access points and a gateway connected to the access points, and a plurality of remote mobile units, the mobile units being capable of wirelessly communicating with at least two of the access points when located within a predetermined range therefrom. Each mobile unit is normally associated with and in communications with a single one of such access points, and has a single network address that is selectable from a set of network addresses that is utilized by the mobile unit only while such mobile unit is active.

The method includes the steps of storing a set of network addresses available for use by users in a server computer on the network; transmitting a network address request to the server computer from a first mobile unit; and assigning a network address from the set of network addresses available to said first mobile unit. The method further includes providing identification information of the user from said first mobile unit to an authentication server; validating the user privileges by the authentication server and communicating such validation to said first mobile unit; and transmitting the network address associated with the user's mobile unit to the telephony gateway.

DETAILED DESCRIPTION OF THE INVENTION

Figure 1:
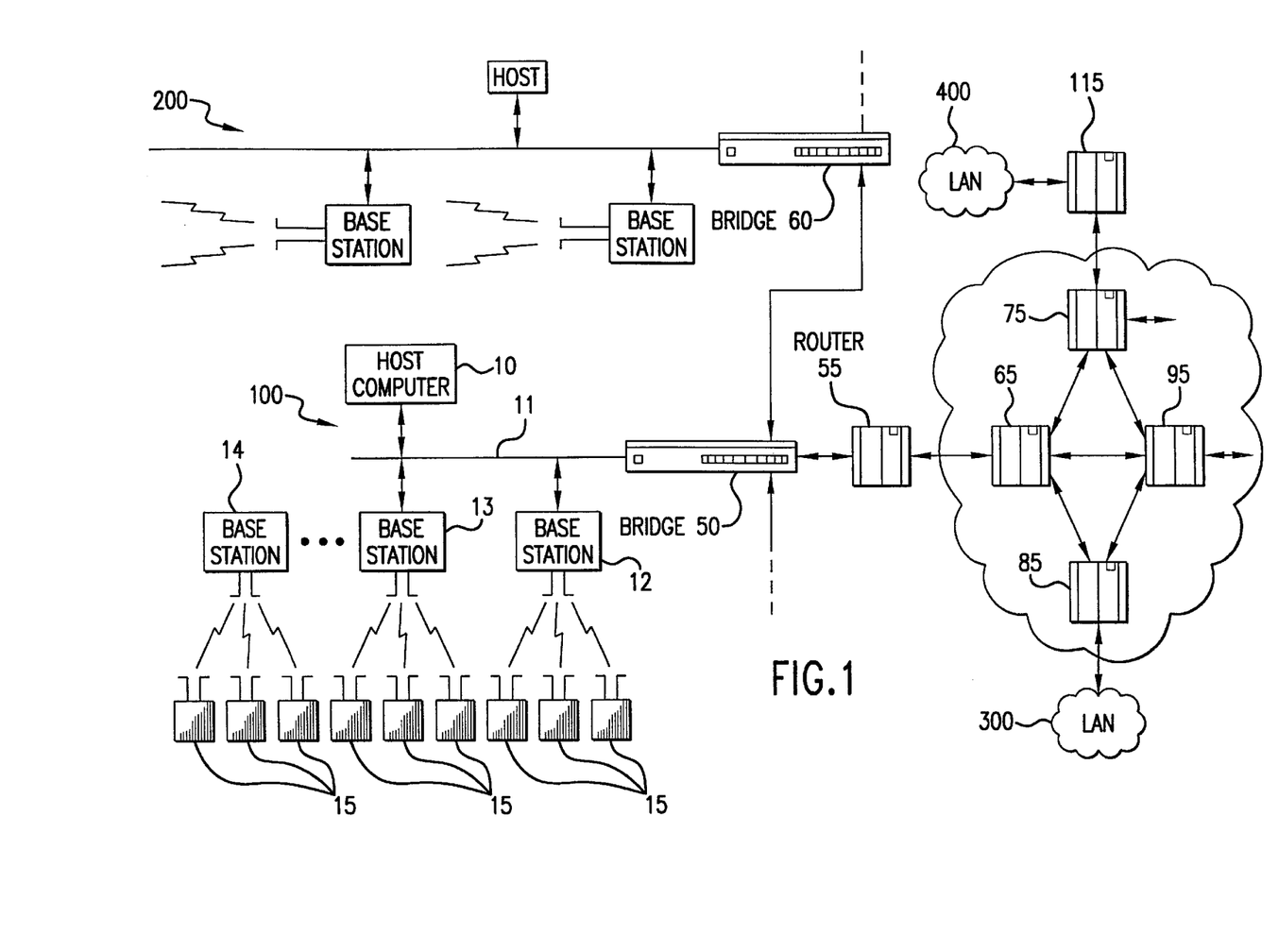
FIG. 1 is a diagram illustrating a wireless local area network in which the present invention may be implemented.

Referring now to the figures, FIG. 1 shows a data communications network in which the embodiments of the present invention may be implemented. A first local area network 100 is illustrated, including a host processor 10 is connected by a wired communications link 11 to a number of stationery access points or base stations 12,13; other base stations 14 can be coupled to the host through the base stations or by an RF link. Each one of the base stations 12,13,14 is coupled by an RF link to a number of remote mobile units 15 In one embodiment, the remote mobile units 15 are hand-held, battery-operated data terminals portable digital assistants or voice communication handsets such as described in U.S. Pat. No. 5,029,183; Ser. No. 08/794,782 filed Feb. 3, 1997, and Ser. No. 09/008,710, filed Jan. 16, 1998, all assigned to Symbol Technologies, Inc., and incorporated herein by reference.

Various other types of remote terminals may be advantageously employed in a system having features of the invention; these remote terminals ordinarily would include data entry facilities such as a magnetic card reader or the like, as well as a display (or printer) for indicating or providing to a user information detected, transmitted and/or received by the terminal. In this embodiment used as an illustrative example, there may be from one up to sixty-four of the base stations (three stations being shown in the Figure) and up to several hundred of the remote units; of course, the network may be expanded by merely changing the size of address fields and the like in the digital system, as will appear, but a limiting factor is the RF traffic and attendant delays in waiting for a quiet channel.

The first LAN 100 may be coupled to additional LANs 200, 300, 400 etc. through controllers such as bridges 50, 60, etc. or routers 55, 65, 75, 85, 95, 105, etc. This communications network as seen in FIG. 1 would ordinarily be used in a manufacturing facility, office building complex, warehouse, retail establishment, or like commercial facility or combination of these facilities, where the data-gathering terminals would be used for inventory control in stockroom or receiving/shipping facilities, at checkout (point of sale) counters, for reading forms or invoices of the like, for personnel security checking at gates or other checkpoints, at time clocks, for manufacturing or process flow control, and many other such uses.

Although hand-held, laser scanning bar-code reader data terminals are mentioned, the data terminals may also include bar-code readers of the CCD or wand type, and may be portable or stationery rather than hand-held. The mobile units 15 may also be voice communication handsets, pagers, still image or video cameras; or any combination of the foregoing. Other types of data gathering devices may be utilized as terminals and use the features of the invention, such as temperature, pressure, or other environmental measuring devices, event counters, voice or sound activated devices, intrusion detectors, etc.

Figure 2:
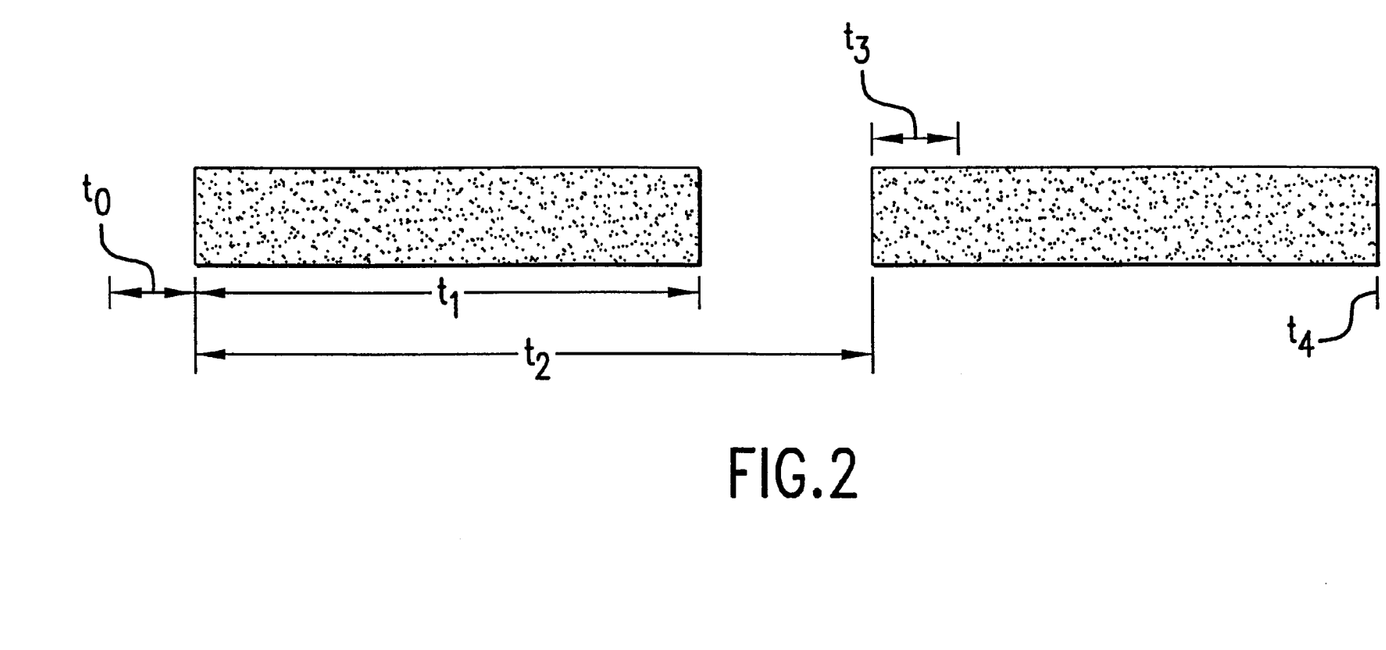
FIG. 2 is a timing diagram showing RF transmission versus time for a data transmission sequence.

According to an important feature of one embodiment of the invention, an RF packet communications protocol is provided between the remote units and the base stations, and includes a transmit/receive exchange, referred to hereinafter simply as an "exchange". This protocol is similar to collision-sense multiple access (CSMA) in that a unit first listens before transmitting, and does not transmit if the channel is not free. As seen in FIG. 2, this exchange always begins with a remote-to-base transmitted packet, representing an RF transmission from a remote unit to be received by the base stations within range. The transmitted packet is followed after a fixed time interval by a base-to-remote unit of RF information transmitted by the base station servicing this particular remote unit. Each of these packets and is of fixed timing; a transceiver in a remote unit begins an exchange at its own initiative by first listening for other traffic for a brief interval $t_0$ (typically 0.3 msec.) and, if the RF channel is quiet, starting a transmission at a time of its own selection (asynchronous to any clock period of the base stations or host computer). This outgoing transmission packet lasts for a time $t_1$ as seen in the Figure, and in an example embodiment this period is 4.8 milliseconds. Then at a precise time delay $t_2$ after it started transmission (e.g. 5 msec after the beginning of $t_1$) the transceiver begins listening for the return packet from the base station. The transceiver in the remote unit only responds to receipt of the packet beginning in a very rigid time window $t_3$ of a few microseconds length, and if the packet has not started during this window then anything to follow is ignored. The packet is an acknowledge signal, and also contains dam if the base station has any message waiting to be sent. The packet also is millisecond in length, regardless of what data is included, if any, so a remote-to-base exchange, including acknowledge, takes about 9.8 msec in the example.

Figure 3:
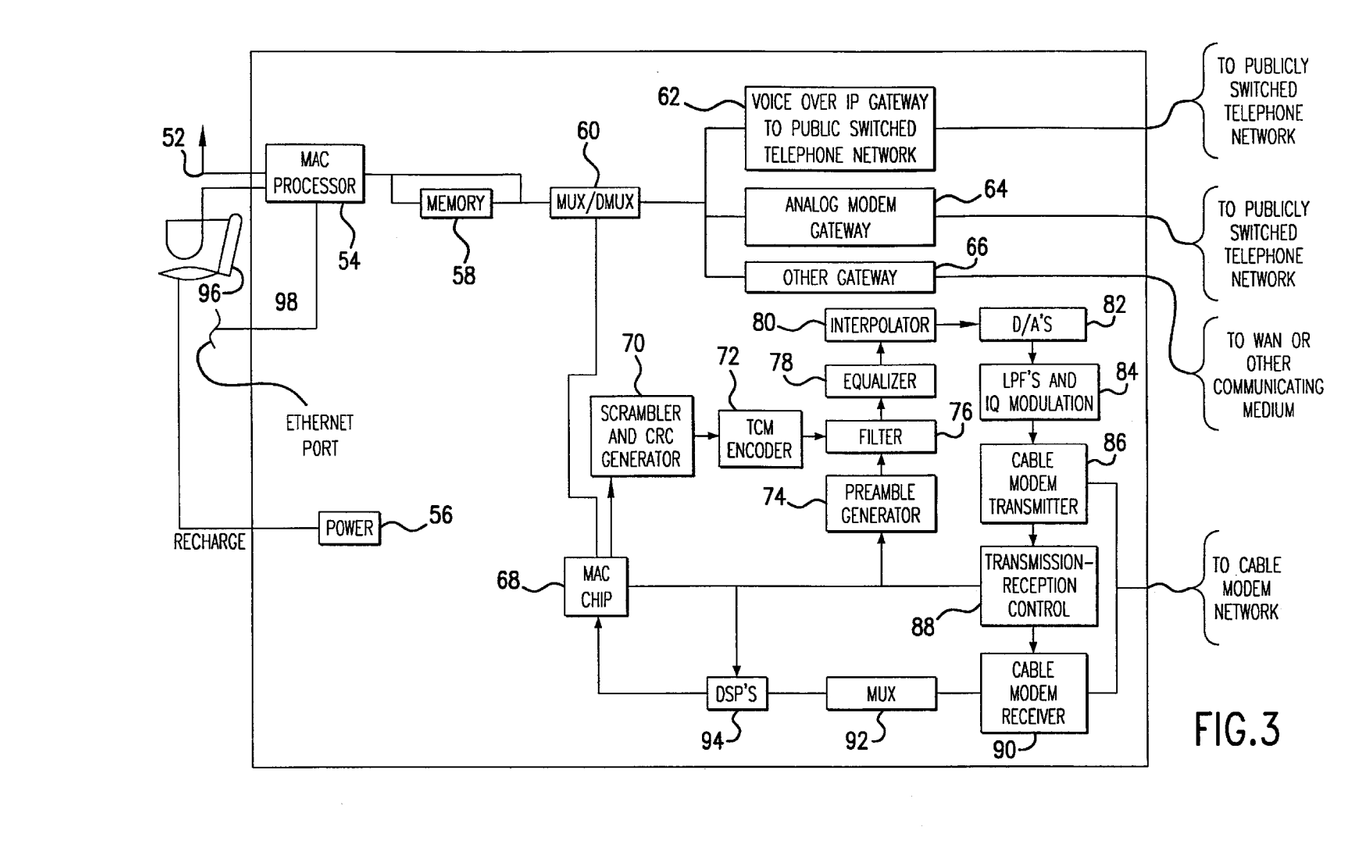
FIG. 3 is a block diagram illustrating an apparatus for interfacing a wireless local area network and a wide area network or public switched telephone network in accordance with a first embodiment of the invention.

FIG. 3 is a diagram illustrating a first embodiment of the invention showing an apparatus 50 which combines the functions of a wireless communication system access point and a telephony gateway in a single unit in accordance with the present invention. In the discussion that follows, we will assume that the mobile unit 15 being utilized as a voice communication handset or wireless portable telephone, although other features such as keyboard data entry, magnetic card data entry, bar code reading data entry could be incorporated in such unit as well, and such unit utilized for simultaneous voice and data transfer over the wireless link. Since IP is the preferred network layer protocol, in the present invention, the handset may also be referred to as a "IP phone" in this patent specification, but it is to be understood that network layer protocols other than IP could be used as well.

The apparatus 50 contains one or more transmitter/receivers 52 for radio communications to the mobile units. The transmitter/receiver 52 is coupled to an access point Media Access Control (MAC) processor 54, which functions to send and receive data frames in the appropriate format to and from the transmitter/receiver 52 at the appropriate times. The processor 54 is also coupled to a memory 58, which buffers data packets.

Although in the present preferred embodiment the MAC processor 54 utilizes an IEEE 802.11 data link protocol, other wireless LANs or WANs and other types of media access control, including FDMA, TDMA, CDMA, and combinations thereof are also within the scope of the present invention. Different MAC processors may be used to accommodate two or more different access techniques, including those of proposed MAC standards of Home RF, Bluetooth, and others.

The memory 58 may be coupled to a switch or processor and multiplexor/demultiplexor 60 which provides processing and switching functions to route the data packets between the MAC processor 54 and an appropriate gateway. The switch or multiplexor/demultiplexor 60 may for example be coupled to voice gateway 62, which utilizes signal processor and codecs to translate the voice packets into analog audio signals suitable for transmission over a public switched telephone network or PBX. The switch or multiplexor/demultiplexor 60 may also be coupled to an analog modem gateway 64, which translates the digital datagrams from the LAN into encoded analog signals suitable for transmission over a public switched telephone network, such as signals complying with the V.90 transmission protocol.

A Voice Gateway 62 also permits audio feedback from a telephone network (e.g. a busy signal) to an IP phone user in a wireless LAN system. For example, a series of feedback audible tones may be provided by the telephone network, which are transmitted to the gateway, packetized, and transmitted over the wireless link to the mobile IP phone. At the IP phone, the data packets are then converted into an analog signal, thereby producing an audible copy of the series of feedback audible tones.

In addition to the voice gateway interfacing to a wired telephone network, interfaces to wireless voice and data networks may also be implemented. There are also a wide variety of both analog and digital cellular radio systems which are in use around the world for telephony and data network applications. The digital ones include GSM, DCS 1800, IS 54 and others. To the extent there is available at the gateway a landline telecommunications system to the destination called party, the use of a cellular radio system may be unnecessary and redundant. However, if such landline system is unavailable or has its service impeded, the provision of a cellular radio system gateway is also within the scope of the present invention. Similarly, in certain remote areas it may also be desirable to provide a satellite radio system capability, such as connectivity to the Iridium phone network. Thus, the multiplexor/demultiplexor 60 may be coupled to any other appropriate type of gateway 66, such as for xDSL, ISDN, FDDI, cellular radio telephony (such as GSM), RAM, ARDIS, CDPD, or satellite radio networks.

The apparatus may also contain a cable modem interface for access to a high bandwidth cable network. A cable network is a network running on traditional coaxial cable (which in most places, was originally designed to carry cable television signals). A cable modem MAC chip 68 is coupled to the multiplexor/demultiplexor 60 and controls the access to the physical cable media (the actual transmissions travelling on the cable modem network) and forms the cable network data frame. There are many different cable modem standards and the apparatus may be designed to be compatible with any one of the standards. In the frequency-agile multimode (FAMM) standard (a modulation technique of the IEEE 802.14 standard), a preamble is inserted at the beginning of the data, with a long preamble used for channel probing and equalization, and a short preamble used for fast resynchronization. Azzam, A. High-Speed Cable Modems. N.Y., McGraw-Hill, 1997. p. 213–19. Data in the body of each frame is scrambled according to a predefined algorithm, and a cyclic redundancy check field is provided for error detection. The FAMM standard supports several different modulation options, but all are a type of trellis-coded modulation (TCM).

If the apparatus is designed for use with the FAMM standard, a transmission over the cable would proceed as follows. The MAC chip 68 would send the data to a scrambler and CRC generator 70, which scrambles the data and generates the error-correcting cyclical redundancy check field. Then it is sent to a TCM encoder 72, which encodes the data in trellis-coded modulation form. A control signal is sent to a preamble generator 74, which then generates an appropriate preamble for the data. The preamble and data are both sent through a filter 76, which would most likely be a digital pulse shaping filter, which is sampled at twice the modulation rate. This information is then passed to an equalizer 78 for equalization. The equalized information is sent through an interpolator 80 (e.g. an interpolation filter), which interpolates the information so that the input to the digital to analog (D/A) converters 82 is at a constant rate for different modulation options, After the D/As 82, the information is passed through lowpass filters and IQ modulation 84, for the final stages of the transmission process. The information is then ready to be transmitted by a cable modem transmitter 86, which sends the information over the cable utilizing control signals received from a transmission-reception control circuit 88.

Signals received from the cable are received by a cable modem receiver 90, which passes the information to a multiplexor/demultiplexor 92, which divides out the cable frequencies into channels. Each of these channels may carry independent information. Each channel of information is sent through at least one digital signal processor 94, which performs the appropriate receiver signal-processing functions and deliver the decoded information conveyed in the body of a frame to the MAC chip.

Since the cable modem standards generally allow for very large bandwidths, the number of possible independent channels is very high. This allows for more users and devices to be used simultaneously. For example, if the apparatus supported eight independent channels, it would be possible to have five independent mobile computer terminals accessing the cable network while at the same time conducting three independent voice conversations over the cable network.

Another feature of the present invention relates to providing recharging and downloading cradles for use with the wireless handset, mobile computer terminals or portable bar code readers, (including pen-like readers depicted in U.S. patent application Ser. No. 08/794,782). The apparatus 50 may therefore optionally include a docking station or well 96 which can be used to store and recharge the wireless handset or mobile computer terminal when not in use. It is also possible to design the well 96 so that when the mobile unit 15 is placed in the well 96, the MAC processor downloads or retrieves data from the mobile computer terminal using an appropriate interface (electrical contact or IR) and either stores it, or sends it out over the WAN.

The automatic downloading of data is useful in applications such as a shopping at home through an catalog of a company. The user may have a small mobile computer terminal or portable digital assistant in which the user enters data of the items selected for purchase from the catalog. When the user decides on a product to buy, he must communicate that information from the mobile computer terminal to the retailer. In the past, the next step would be to connect the mobile computer terminal to a host computer, either directly or through a wireless network. The host computer then utilizes a modem or similar interface for communicating with a home office of the catalog retailer. Using the present invention, however, as an alternative to implementing a wireless LAN, the user may simply place the mobile computer terminal in the well 96 when he has finished using it. Using power 56, the well 96 acts to recharge the mobile computer terminal, while also automatically accessing information contained on the mobile computer terminal, including the retailer information and purchase information. The apparatus then automatically routes the data to the appropriate gateway, dials the PSTN sales telephone number of the office of the affiliated company or equivalently send out an IP network addressed message over an Internet connection and transfers the appropriate information. The apparatus may access an electronically stored serial number of the mobile computer terminal and transmit that to the company as well, allowing the company to look up a database entry for the user, the entry containing credit card, billing, and other important information. Thus the user is able to complete an entire transaction by simply selecting a product by pen or keyboard entry on his mobile computer terminal and placing the computer in a well 96. In a network including wireless IP phones, the well may be utilized to recharge the wireless IP phones in a similar fashion to that of computer devices.

In addition to the gateway, in order for the access point to connect with other access points on the network, the apparatus 50 may contain an Ethernet, IEEE 802.X LAN, or similar data port 96. Serial interfaces including the Universal Serial Bus (USB) or IEEE 1394 bus could also be used. This allows a user to directly connect the gateway to other nodes on a wired LAN and transfer data in the form of 802.X packets or as serial data to and from the terminals, appliances or computers connected to apparatus 50.

In addition, the apparatus 50 may include a communications controller 99 having a plurality of communications ports, with a specific set of access points in the network being connected by wire to a predetermined port of the communications controller so that messages received by said controller and destined for a particular mobile unit currently associated with a specific access point are transferred to the corresponding port of the communications controller and thereby to the associated access point for communications to the specified mobile unit.

Figure 4:
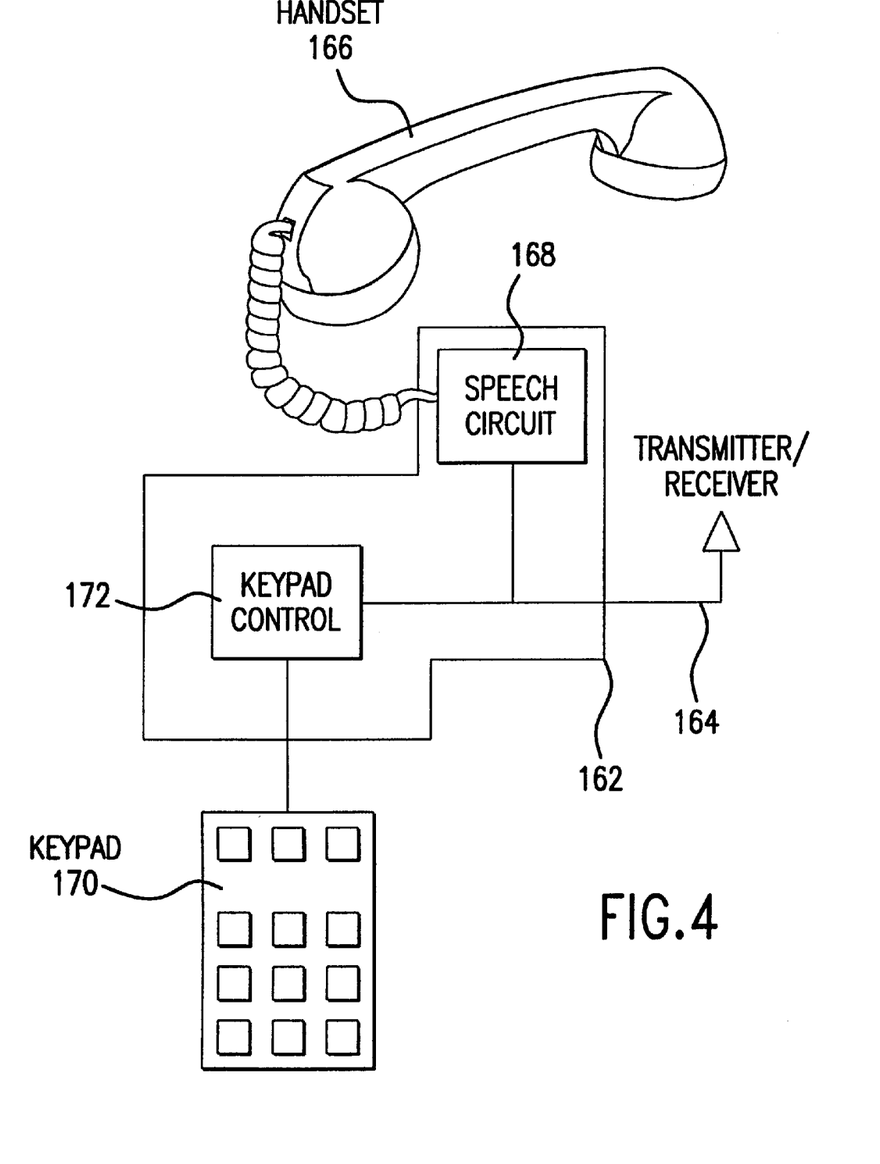
FIG. 4 is a block diagram illustrating a wireless desk phone in accordance with a second embodiment of the invention.

Another embodiment of the present invention includes a wireless desk telephone illustrated in the block diagram of FIG. 4. Such a wireless desk telephone is designed to communicate by radio to a stationary base station of wireless LAN connected to a wired telephony network. The telephone 162 may appear like a normal desk phone, with a handset, cable and keypad, but rather than a phone line running to a RJ11 wall jack, the unit contains a battery and a transmitter/receiver 164 which allows it to communicate using radio communications with one of the access points on a wireless LAN, and to apparatus 50 or a gateway, and thereby to the PSTN or other telephony network. The design allows the desk telephone to be portable and moved into any area where it could associate with an access point without the difficulty or expense to run traditional phone lines to the telephone.

The desk telephone includes a portable housing 162 including a keypad 170; a handset 166 including a microphone and a speaker; and a cable connecting said housing and said handset. A codec and signal processor is disposed in the housing for converting audio signals from the microphone into digital signals or voice datagrams. A keypad processor 172 is also provided in the housing for processing data (such as the extension or telephone number) entered on said keypad by the user into a destination network address to be used with the packetized digital signals. Circuitry first converts analog voice signals to digital samples using a coder-decoder (CODEC) using one of the ITU G.700 series standards for voice encoding. A digital signal processing chip may then compress the digital signal, since there is much silence and redundancy in most voice communications. Next, packets are formed from the compressed signal stream A protocol stack software assembles a frame including the network address and the datagrams to be transferred over a radio communication link. A radio transceiver for communication frames including said packetized digital signals to and from a stationary base station preferably using frequency hopping spread spectrum communications in the 2.4 GHz ISM band. These packets will normally contain a header with a flag indicating that the packets contains voice encoded data. This allows a network node such as a hub or router to treat a voice packet differently from packets containing data, since it is desirable invoice communications that there be very little delay in the end-to-end transmission of voice packets, as opposed to data packets, since packet data service will not greatly be compromised when short packet delays are introduced.

At the access point, the packet disassembly takes place. Packets are converted to a serial data stream, uncompressed, and converted back to an analog voice signal. The appropriate gateway then transmits the voice signal over the voice communication network. The entire analog to data to analog conversion is described in the H.323 standard.

At the other end, assuming there is another wireless network, the gateway converts the analog voice signals into digital data packets, which are then transmitted over the wireless network to the destination IP phone.

Figure 5:
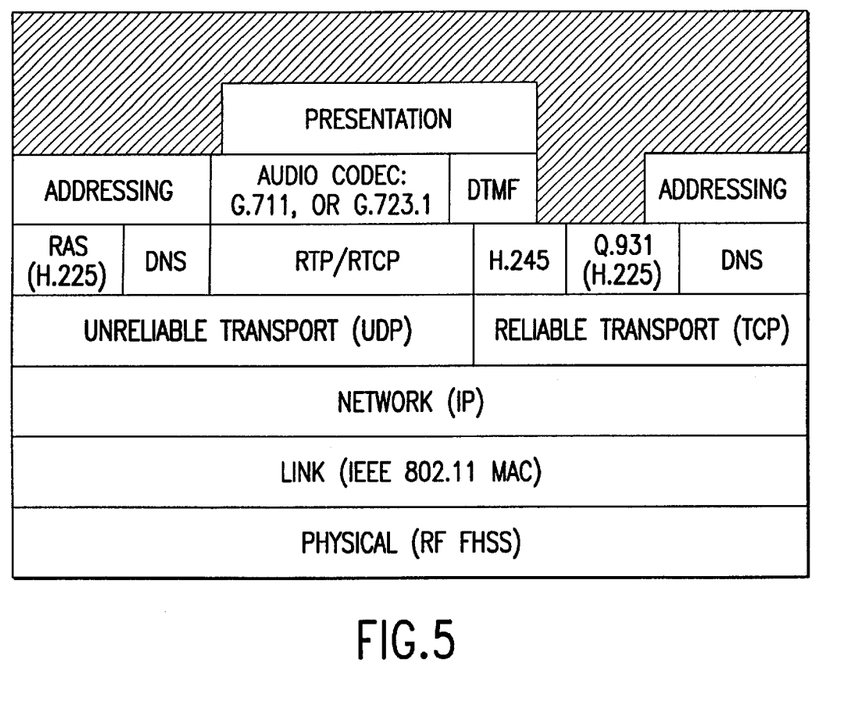
FIG. 5 is a block diagram of the protocol stacks that may be implemented in the wireless LAN in accordance with the invention.

The type of network software that may be implemented in a mobile unit according to the present invention is illustrated in FIG. 5. A variety of different higher level protocols may be utilized in a Voice over IP system, as specified in the protocol stack of FIG. 5. In the preferred embodiment of the present invention, the PHY layer is a frequency hopping spread spectrum (FHSS) radio frequency system. The link layer is preferably an IEEE 802.11 MAC protocol. The network layer is preferably the Internet Protocol (IP). Above the network layer, depending upon Quality of Service and other criteria, a number of different standards illustrated in the Figure may be utilized.

The software for controlling the initialization of the various protocol stacks corresponding to different types of networks may include a multiple provider router ("MPR") executing in the memory. For example, there may be two network drivers designated as driver A, and driver B. These network drivers are invoked by the OPR to authenticate an provide access to the specific network services provided by the drivers. The input/output devices may contain two distinct physical network connections and data buffering or storage devices associated with each channel.

The use of two network connections illustrate that the embodiments of the present invention may be operative in an environment where the computer system is connected to one or more networks and that these networks may be heterogeneous. One skilled in the art will appreciate that the methods of the present invention may be practiced on processing systems with varying architectures, including multi-processor environments, and on systems with hard wired logic. Also, one skilled in the art will realize that the present invention can be implemented in a stand-alone environment where other types of drivers are used to support secure access to the communications services and channels that may be available.

Software systems often provide several application programming interfaces (hereinafter referred to as "APIs", or sets of routines) for carrying out the methods of the present invention. Typical components of the software architecture include application programs, a multiple provider router dynamic link library ("DLL"), and network drivers which reside in the memory of the computer system. The MPR code implements a set of network APIs, which are network independent and can be used by applications programs at higher levels on the protocol stack to communicate with the various network interfaces.

Special features can be implemented in the case where the wireless IP phone connects to a gateway to the PSTN. Most users are accustomed to features which are common in analog landline telephones. These features include several signaling aspects including a dial tone produced when a user first picks up a telephone handset, a busy signal produced if a dialed number is currently in use, a series of rings produced if a dialed number has not answered, etc. The features may also include redialing, speed dialing, conference calling, caller identification, etc. These features can be emulated in the apparatus when the LAN is a wireless IP phone system and are typically performed in software.

Figure 6:
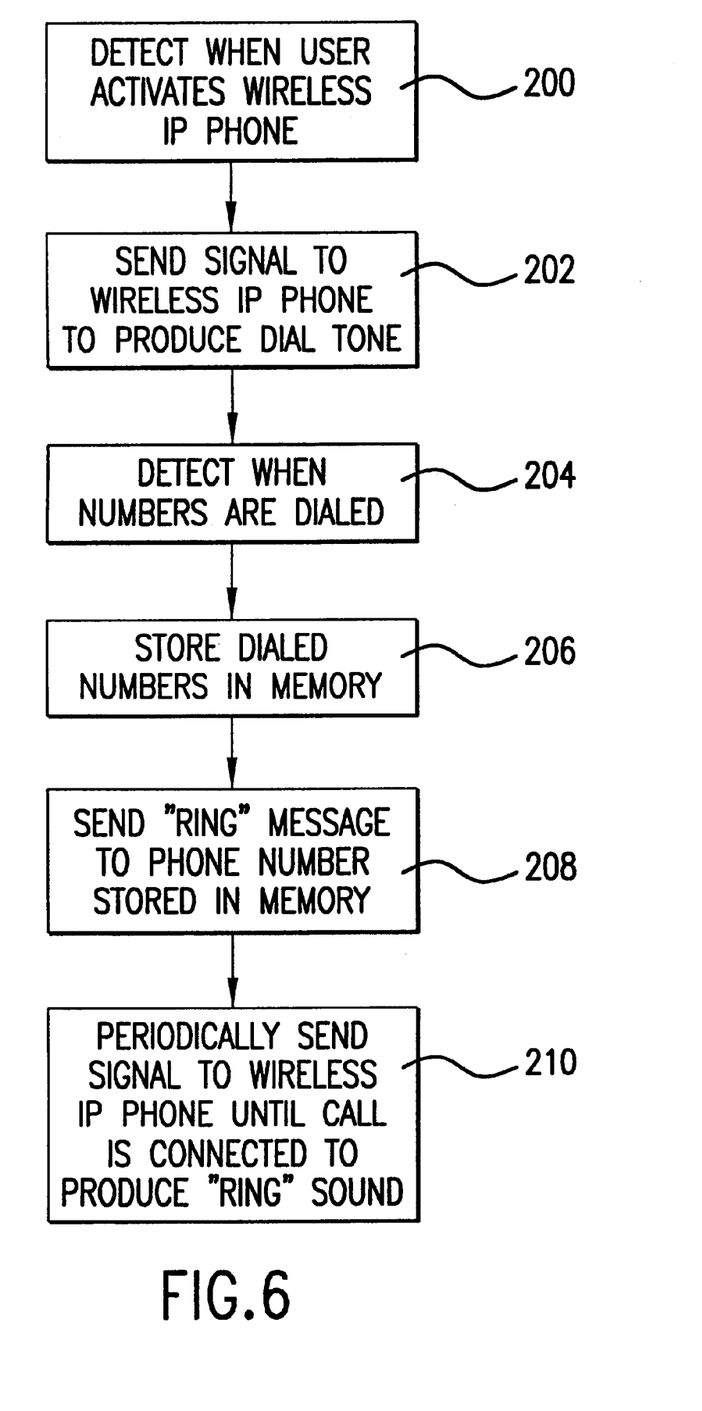
FIG. 6 is a flow diagram illustrating a method for handling an outgoing call in a wireless IP phone system according to the present invention.

FIG. 6 is a flow diagram depicting a method for handling an outgoing call in a wireless IP phone system. At step 200, the system detects when the user activates the wireless IP phone, such as when the user has entered the destination and activates a function key labeled "send". This would be equivalent to what is generally known as "picking up" the telephone. In portable telephones, however, the user does not necessarily pick a telephone off of a base unit in order to activate the line, but may simply press a button labeled "call", "on", "talk", or something similar. The wireless IP phone then sends a signal to the access point indicating that it has been activated for voice communications.

At step 202, the system sends an acknowledgement signal to the wireless station which produces a display signal indicating the station is on the network. However, the advantage of waiting for acknowledgement from the apparatus is that there may be some "line checking" functions to be performed so that the acknowledgement signal to the wireless IP phone will not be sent if there is a problem with the wireless channel. Potential problems include the wireless IP phone being outside the range of the transmitter/receiver, excessive loading or network traffic prohibiting voice communications, or other difficulties that would result in a quality of service below a predetermined threshold. If the IP phone cannot associate with an access point, or loses such association, it displays "No Network" in the display. In addition, when the phone is idle, and the wireless link is being impeded, the IP phone may sound the out-of-range tone (one long beep and two short beeps). When the IP phone is active, and the connection is being impeded it sounds the call-waiting tone (two short beeps) to the user. The user has ten seconds to move within range of an access point on the network before the IP phone automatically disconnects the call.

Once a "welcome" and positive status indication is produced, the user may begin dialing a number. Therefore, at step 204, the system will detect when numbers are dialed, and at step 206, the system will store these numbers in memory.

At step 208, assuming a voice gateway connection, the gateway sends a "ring" message to the phone number being called. A "ring" message indicates to the caller that it should produce a series of rings in the earpiece indicating that a caller is attempting to contact it. How this "ring" message is configured and signaled is largely dependent on the type of wide area or switched telephone phone network to which the apparatus is connected. If the apparatus is connected to a cable modem network, then the "ring" message would be encapsulated in a cable modem protocol packet.

The cable modem protocol can briefly be described here. In the FAMM standard, upstream frames begin with a preamble and end with a tail sequence. The preamble may be one of two sequences. The first is a long preamble used for channel probing and equalization. This preamble sequence begins with a tone. After a period T, the phase of the tone is reversed. In the receiver, the phase reversal may be detected even when there is strong distortion that is encountered without equalization. The phase reversal acts as a time marker, indicating the beginning of a subsequently transmitted sequence of equalizer training symbols. The second possible sequence is a short preamble used for fast resynchronization. This is a short sequence of modulation symbols chosen such that a receiver may establish the timing phase and carrier phase with suitable processing methods.

The frame body contains protocol data and user data. This data is scrambled. It is then followed by a cyclic redundancy check (CRC) field, which is used for error correction. A tail section then follows if trellis coded modulation (TCM) is used, so that it may reach a known code state before the end of the signal transmission. In the FAMM standard, data rates between 0.5 Mbit/s and 16 Mbit/s are supported. One of ordinary skill in the art will realize, however, that there are other types of cable modem standards which may be utilized as well.

At step 210, the apparatus periodically sends a signal to the wireless IP phone until the call is connected to produce a "ring" sound in the earpiece of the destination handset. The ring sound will most likely emulate the commonly known "ring" sound of landline telephone systems (in timbre, length and time between rings). The ringing continues until the call is connected or until the user decides to decline the call by depressing the "End" key.

Assuming the call is connected, the IP phone converts analog voice to digital packets using the steps described in connection with the embodiment of FIG. 4.

Figure 7:
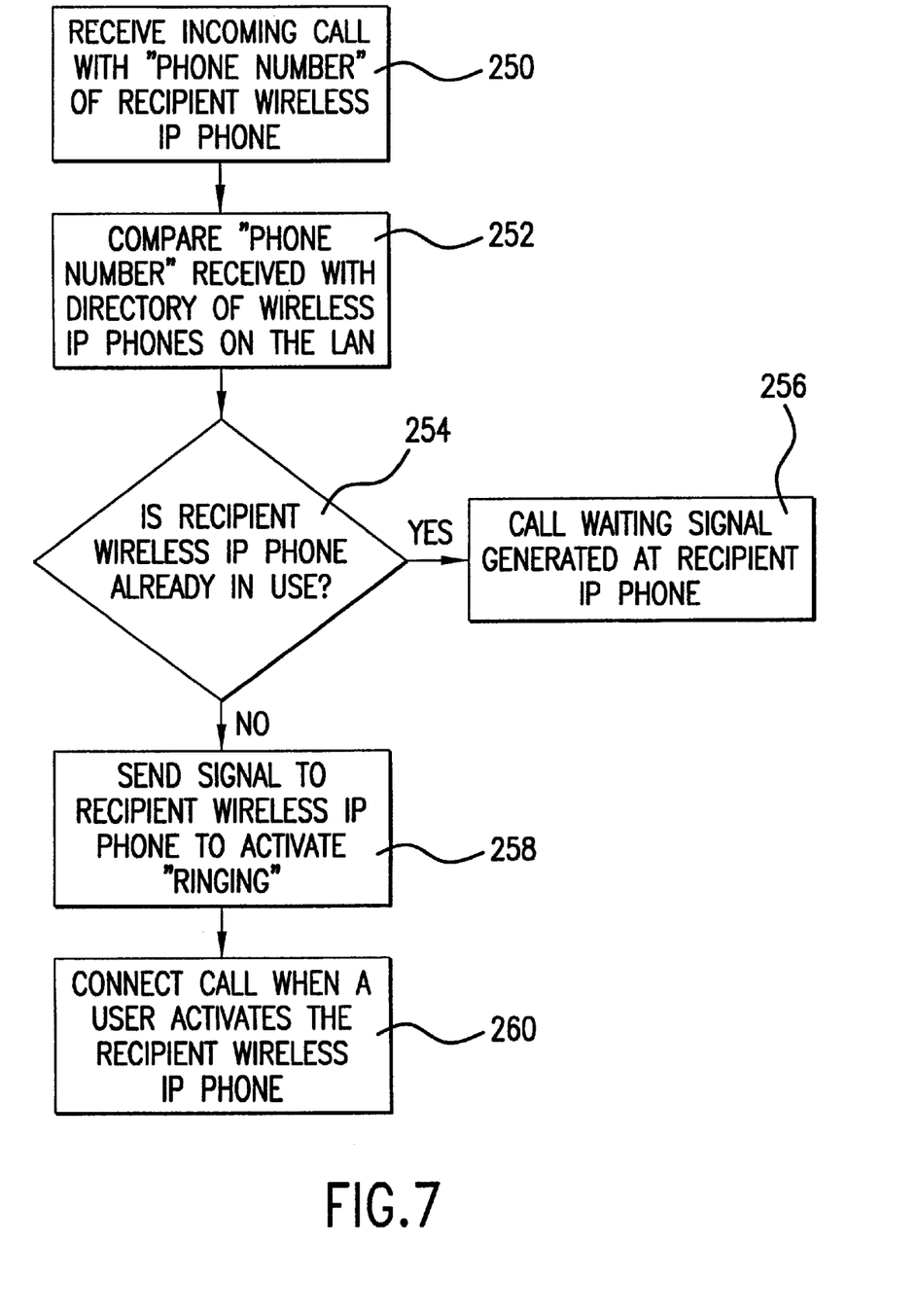
FIG. 7 is a flow diagram illustrating a method for handling an incoming call in a wireless IP phone system according to the present invention.

FIG. 7 is a flow diagram illustrating a method for handling an incoming call in a wireless IP phone system. At step 250, an incoming "ring" message is received which includes a "phone number" of the caller's wireless IP phone. The usage of the term "phone number" herein includes not only traditional PSTN phone numbers but any other means of uniquely identifying a user such as the IP address, or name through the use of a call management agent.

The called IP phone may then "ring" in accordance with whatever sound the phone is designed to make when an incoming call is routed to it. At step 260, when the called user then activates the "send" key on wireless IP phone to accept the call, the call will be connected. If the caller user activates the "end" key, declining to accept the call, the call is disconnected. Alternatively, the call may be connected to a voice mail server to record a message from the caller.

In order to communicate a packet of data to a wireless communication station, the packet must include the address corresponding to an identification network address of the wireless communication station. An Internet protocol address (IP address) contained in the packet header is exemplary of an identification address which can be used to address packets of data which are to be routed over a network using TCP/IP protocol to the communication station. The IP address is, of course utilized when transmission are made pursuant the Internet Protocol. Analogous network addresses are used when data is to be transmitted pursuant to other protocols, such as the Novell IPX protocol, or the X.25 protocol.

Another feature of the apparatus according to the present invention is to supply a network address to a specific wireless handset that communicates with it following authentication of the identity of the user, and authorization only for the class of service assigned to that user. This feature is particularly useful in applications and environments in which the wireless handsets are initially not supplied with a fixed network address and not identified with a specific user until an authorization procedure is completed. Such applications are important in wireless network environments to control entry into a network and authorize association of wireless terminals or telephony handsets on the network. Since the communications protocols for wireless networks are typically open standards, interoperable terminals or handsets belonging to unauthorized users in range of a network access point may be able to communicate with or listen to the network traffic, or utilize the network to communicate over private network facilities and channels. In the case of a network using the IP protocol, the network address would be the IP address. For full generality, we use the term "network address" in the discussion that follows, although in the preferred embodiment that network address would be the IP address.

The proposed initialization and authorization procedure is as follows: the user picks up any handset among the several that may be available and turns it on. A dialog box appears on the display on the handset requesting the user to provide a PIN number or password. The number is entered on the handset, and an network address is assigned to the handset by a process to be described below. The apparatus then stores in a memory (for example, in a telephony gateway unit) the assigned network address and associates it with the user's voice telephone network identity, such as referenced by the user's personal extension number on a corporate PABX system, or a telephone number in the PSTN. This storage process thus "registers" the current IP address of the handset in use with the user identification. Such network address record is maintained as long as the mobile handset is active.

The goal of the registration process is a convenience for authorized users that may have available more than one type of wireless handset, or even several identical handsets, to select any one of them for use at any given time. In other words, the goal is to make any network compatible wireless handset available for use by any user, at any time, and at any place. Once the user identifies himself, on the handset and a network address assigned, the gateway and network is then able to transmit incoming messages to the user at the network address currently used by that specific handset. Since the extension number (or PSTN telephone number) of the user is fixed, someone making a voice call to that user (either by regular PSTN telephone or network Voice over IP telephony) will typically use the fixed extension number of that user. The corporate PABX, or Voice over IP network, will route the call to the telephony gateway server associated with that number, will then look up the current network address of the specified user, and transmit the messages using the network address to the user over the Ethernet to the appropriate access point, or by RF broadcast from the corresponding access point.

The process of assigning an network address to a wireless handset may be performed by a domain name server (DNS) or a dynamic host configuration protocol (DHCP) server connected to the network. Such services provide domain name to network address translation and temporary assignment of an network address to the mobile unit. Alternatively, the set of available network addresses may be stored internally in a memory in the handset itself, and a specific network address released to the user that is associated with the user's identification.

Another feature of the present invention may be to automatically to provide a set of parameter settings, or "class of service" options, associated with a particular user upon the wireless handset being authorized and registered. For example, a particular user may have a list of speed dial numbers, ringing options, of other personal options or features that the user would like implemented whenever a handset is activated by that user. These parameters settings may be stored along with the PIN number or other authorization data. Once the handset is authorized, the parameter settings are released from internal memory, or automatically downloaded directly to the handset in use, and the operational parameters of the handset are adjusted to such settings.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

We claim:

1. A data communications network including a plurality of stationary access points and a plurality of remote mobile units, the mobile units being capable of wirelessly communicating with at least two of the access points when located within predetermined range therefrom and being normally associated with and in communications with a single one of such access points, a mobile unit having a single network address that is selectable from a set of network addresses and is utilized by the mobile unit only while such mobile unit is active wherein the mobile unit communicates with the associated access point using a MAC address, and with other mobile units using an IP network address, compromising:

a processor located at one of said access points for detecting a message sent by a first mobile unit and determining from the message whether it is to be routed to another mobile unit or to another communication station and for providing identification information of the user from the first mobile unit to an authentication serve and for validating the user privileges by the authentication server and communicating such validation to said first mobile unit; and a gateway connected to said access points and functioning to provide a two-way voice channel of communications between the first mobile unit and said another communication station.

2. A network as defined in claim 1, wherein said message includes the addressing mode selected by the user of the mobile unit, said addressing modes including IP addresses, intercom number, name, and extension number.

3. A network as defined in claim 1, wherein said gateway is a H.323 gateway located in the same housing as an access point and directly connected to the public switched telephone network.

4. A network as defined in claim 1, wherein said gateway is capable of handling multiple channels of communications simultaneously, and includes a protocol converter for converting the messages received from the access points into a format suitable for communication over a wide area network and vice versa.

5. A network as defined in claim 3, wherein said gateway includes an analog modem for transmitting and receiving digital data from an access point and converting it into a form suitable for transmission over the public switched telephone network.

6. A network as defined in claim 1, further comprising a communications controller having a plurality of communications ports, with each access point in a set of access points being connected by wire to a predetermined port of said communications controller so that messages received by said controller destined for a particular mobile unit are transferred to the corresponding port of the communications controller and thereby to the associated access point and the first mobile unit.

7. A network as defined in claim 1, wherein each of the mobile units use frequency hoping spread spectrum radio frequency communications.

8. A telecommunications network comprising a wireless local area network including a plurality of stationary access points connected in a wired network and a plurality of mobile units, each mobile unit being capable of communicating with an access point at a predetermined range therefrom in the form of data packets including a destination network address and a circuit switched network, wherein each mobile unit communicates with the associated access point using a MAC address, and with other mobile units using an IP network address;

a mobile unit for providing voice communications on the subnetwork for a user, including a microphone, a speaker, a keypad, a display and an RF transceiver for communications; and a combined gateway access point including an RF transceiver for communicating with mobile units at a range therefrom, and a processor for converting the network addressed packetized voice or a data signal from the mobile unit to an analog signal for transmission over the circuit-switched network, and for transmitting such voice or data signal to the selected destination station on the telecommunications network and for providing identification information of the user from one of the mobile units to an authentication serve and for validating the user privileges by the authentication server and communicating such validation to that mobile unit.

9. A method of operating a data communications network including a plurality of sets of stationary access points and a gateway connected to the access points, and a plurality of remote mobile units, the mobile units being capable of wirelessly communicating with at least two of the access points when located within a predetermined range therefrom and being normally associated with and in communications with a single one of such access points, each mobile unit having a single network address that is selectable from a set of network addresses and is utilized by the mobile unit only while such mobile unit is active, wherein each mobile unit communicates with the associated access point using a MAC address, and with other mobile units using an IP network address, comprising the steps of:

(a) storing a set of IP addresses available for use by users in a server computer on the network (b) providing identification information of the user to said first mobile unit;

(c) validating the user privileges in said first mobile unit;

(d) assigning an IP address from the set of IP addresses available for use by said first mobile unit; and (e) transmitting the assigned IP address associated with the user and with said first mobile unit to the telephony gateway.

10. A method of operating a data communications network including a plurality of sets of stationary access points and a gateway connected to the access points, and a plurality or remote mobile units, the mobile units being capable of wirelessly communicating with at least two of the access points when located within a predetermined range therefrom and being normally associated with and in communications with a single one of such access points, each mobile unit having a single network address that is selectable from a set of network addresses and is utilized by the mobile unit only while such mobile unit is active, wherein each mobile unit communicates with the associated access point using a MAC address, and with other mobile units using an IP network address, comprising the steps of:

(a) storing a set of network addresses available for use by users in a server computer on the network;

(b) transmitting a network address request to the server computer from a first mobile unit;

(c) assigning a network address from the set of network addresses available to said first mobile unit;

(d) providing identification information of the user from said first mobile unit to an authentication server;

(e) validating the user privileges by the authentication server and communicating such validation to said first mobile unit; and (f) transmitting the network address associated with the user's mobile unit to the telephony gateway.

11. A method as defined in claim 10 further comprising the step of downloading user-specific operating parameters to the mobile unit form the server computer.

* * * * *